Patented Feb. 8, 1944

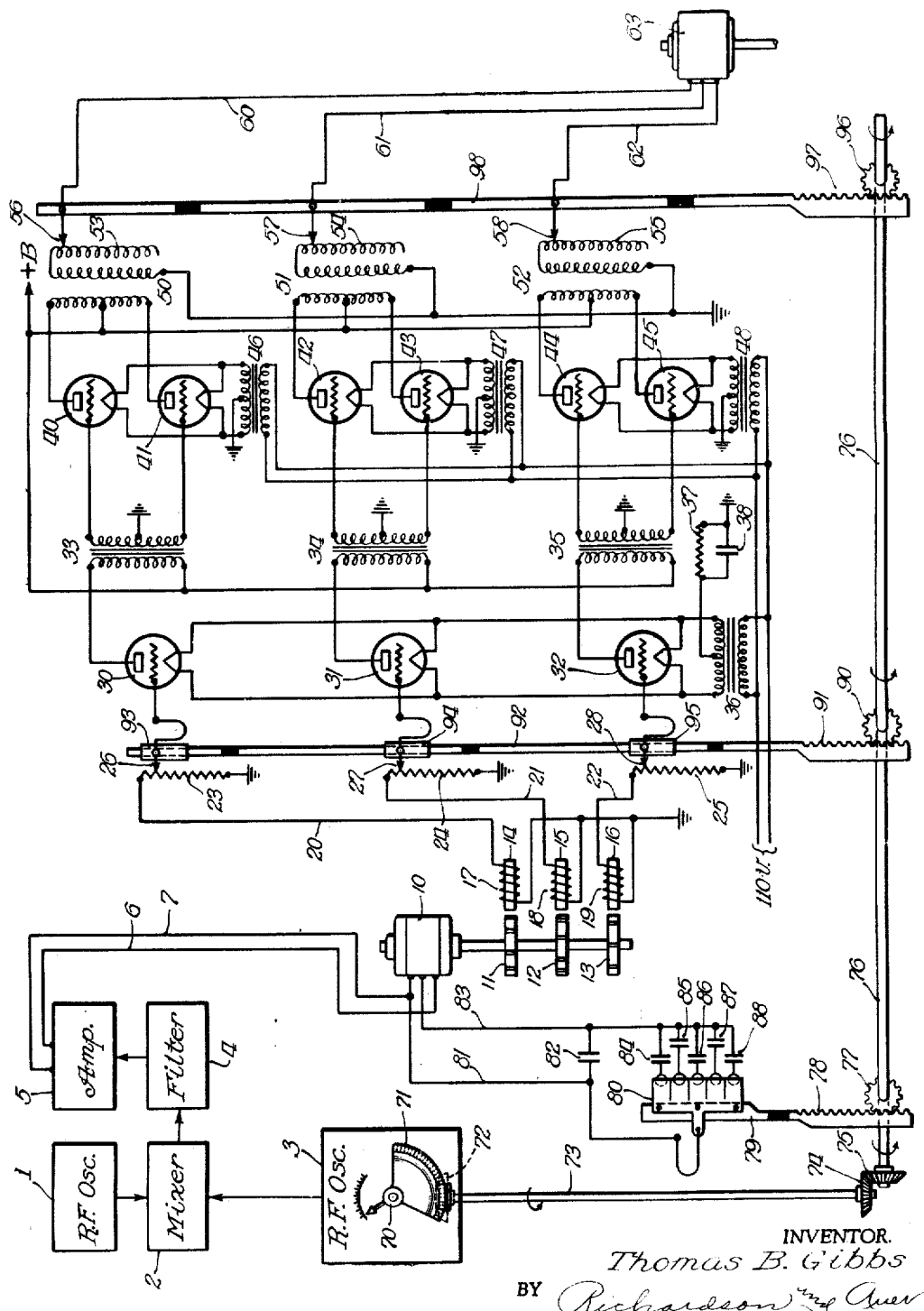

2,340,875

UNITED STATES PATENT OFFICE 2,340,875

VARIABLE FREQUENCY GENERATOR

Thomas B. Gibbs, Delavan, Wis., assignor, by mesne assignments, to George W. Borg Corporation, Chicago, Ill., a corporation of Delaware Application May 24, 1941, Serial No. 395,113

12 Claims. (Cl. 172—274)

The present invention relates in general to variable frequency generators, and more in particular to variable frequency polyphase generators. The object of the invention is to produce an economical and efficient generator of this character in which the frequency can be varied over a wide range and adjusted to any desired value within such range with a high degree of accuracy.

The invention will be more fully described hereinafter with reference to the accompanying drawing, which shows by means of a conventional circuit diagram the apparatus involved and the circuit connections thereof.

Referring the the drawing, the rectangles 1 to 4, inclusive, represent the component parts of a beat frequency oscillator, which comprises the radio frequency oscillators 1 and 3, a mixer stage 2, and the filter stage 4. The construction and operation of a beat frequency oscillator are well known and hence the circuits are not shown in detail. It will suffice to say that the outputs of the two radio frequency oscillators 1 and 3 are combined at the mixer 2, to produce a beat frequency which is equal to the difference between the oscillator frequencies. The output from the mixer stage also includes components having other frequencies, but these undesired components are eliminated at the filter stage 4, which is arranged to pass only the desired beat frequency component. The filter output is delivered to an amplifier which is represented by the rectangle 5. The amplifier may be of known type and delivers single phase power of variable frequency to the output leads 6 and 7.

The reference character 10 indicates a two-phase synchronous motor of the capacitor type, which is connected to the power supply line 6—7, as shown. The conductor 7 extends directly to one winding of the motor and extends to the other winding over a path which includes conductor 81, condenser 82, and conductor 83. Conductor 6 is common to both windings. This is a well known circuit arrangement for securing two-phase or quarter-phase alternating currents for running a two-phase motor from a single phase supply line. A number of other condensers 84 to 88, inclusive, are shown and are connected in parallel with the condenser 82 through a switching device which includes the multi-contactor 80. The purpose of this device is to change the effective capacity in series with the leading phase motor winding in accordance with changes in frequency, as will be described fully later on.

The motor 10 drives a three-phase generator which comprises three toothed disks 11, 12, and 13, three magnets 14, 15, and 16, and the three windings 17, 18, and 19. The generator windings are Y-connected, and the common junction is grounded as shown. The proper phase relation between the voltages developed in the three windings may be obtained by a staggered arrangement of the toothed disks on the motor shaft, as shown, or the magnets may be angularly spaced around the shaft.

The disk generator delivers three-phase current over the output leads 20, 21, and 22 to the three potentiometers 23, 24, and 25. The potentiometers are simultaneously adjustable in accordance with changes in frequency, as will be described shortly.

The tubes 30, 31, and 32 with their circuit connections constitute a three-phase amplifier. Type 845 tubes may be used. The grids of the tubes are supplied with three-phase control voltages taken from the three potentiometers. The filaments of the tubes are supplied with heating current by means of a transformer 36, the primary winding of which is connected to a source of commercial alternating current. The mid-point of the secondary winding of transformer 36 is grounded through a resistor 37 to complete the grid and plate circuits of the tubes. A by-pass condenser is indicated at 38. The plate circuits of the tubes 30, 31, and 32 include the primary windings of the transformers 33, 34, and 35, respectively. A source of direct current is indicated by the reference character +B and may supply a direct current potential of about 1200 volts. The negative terminal of the direct current source should, of course, be grounded.

The tubes 40 to 45 may be Type 805 power tubes, and are connected in pairs to provide three push-pull power amplifiers, one for each of the three phases.

Tubes 40 and 41 constitute the amplifier for the first phase. The grids of the tubes are connected to the opposite terminals of the secondary winding of transformer 33, and the plates are connected to the opposite terminals of the primary winding of the transformer 50. The filaments of the tubes 40 and 41 are supplied with heating current by means of a transformer 46, as shown. The mid-points of the secondary windings of transformers 33 and 46 should be grounded as shown. The mid-point of the primary winding of transformer 50 is connected to the positive terminal of the source of direct current referred to above.

The power amplifier for the second phase comprises the tubes 42 and 43, having their grids connected to opposite terminals of the secondary winding of transformer 34 and their plates connected to opposite terminals of the primary winding of transformer 51. Heating current for the filaments of the tubes is supplied from a transformer 47.

The power amplifier for the third stage comprises the tubes 44 and 45, which are arranged the same as the tubes of the other power amplifiers, the grids being connected to the secondary winding of the transformer 35 and the plates being connected to the primary winding of transformer 52. The transformer 49 supplies heating current to the filaments of the tubes.

The transformers 50, 51, and 52 are output transformers, supplying power to the three-phase output circuit comprising conductors 60, 61, and 62. The secondary windings may be Y-connected, and the common junction is preferably grounded as shown. These transformers are preferably provided with sliders 56, 57, and 58 by means of which the number of effective turns in the secondary windings can be varied in accordance with changes in the frequency of the generator.

Considering transformer 50, the outside layer 53 of the secondary winding is bared of its insulation along the path of the slider 56, so that the slider can make contact with the individual coils of the layer in the various positions which it may assume. Such constructions are well known, particularly in the case of potentiometers, and hence the described arrangement will be readily understood. The outside layers 54 and 55 of the secondary windings of transformers 51 and 52 are arranged the same way and cooperate with sliders 57 and 58, respectively.

The reference character 63 indicates a three-phase motor which is supplied with power over the conductors 60, 61, and 62.

The frequency of the generator is varied by varying the frequency of the radio frequency oscillator 3, which contains a tuning element adjusted by means of the knob 70. Associated with the tuning knob there is a pointer and scale, the latter being preferably calibrated with reference to the output frequency of the generator in cycles per second. As shown in the drawing, the tuning knob 70 is set for the lowest output frequency within the range adapted to be covered. If desired, the scale can be calibrated in revolutions per minute of the motor 63 rather than in cycles per second.

Mounted on the same shaft with the tuning knob 70 there is a toothed sector 71, which is in engagement with the beveled gear 72 on shaft 73. Rotation of the knob 70, therefore, rotates shaft 73. The shaft 73 is arranged to drive shaft 76 by means of beveled gears 74 and 75. The shaft 76 is a common drive shaft for the adjusting devices in the generator.

In order to adjust the capacity in parallel with the condenser 82, the multi-contactor 80 is mounted on an arm 79 which is connected to a rack 78. The arm 79 is moved longitudinally by the pinion 77 with which the rack 78 is in engagement. In a similar manner, the pinion 90 moves the arm or bar 92 by means of the rack 91 and thus adjusts the potentiometer sliders 26, 27, and 28. The sliders 56, 57, and 58 of the transformers 50, 51, and 52 are controlled by the bar 98, which is operated by the rack 97 and the pinion 96.

The apparatus having been briefly described, the operation of the complete circuit will now be explained.

With the knob 70 of the radio frequency oscillator 3 adjusted as shown in the drawing, the output frequency of the beat frequency oscillator will be at the lower limit of the frequency range, which may be 60 cycles per second, for example. The oscillator will therefore supply 60-cycle control voltages to the amplifier 5, and the latter will supply 60-cycle power to motor 10 over the conductors 6 and 7.

The condenser 82 and the condensers 84 to 89 have such values of capacity that when 60-cycle alternating current is supplied to the motor 10 the currents in the two motor windings will have the proper phase relation; that is, the currents are 90 degrees apart in phase. It will be observed that all of the condensers are connected in parallel when operating on 60-cycle current.

The motor 10 drives the generator disks 11, 12, and 13, whereby three-phase alternating current is generated in the windings 17, 18, and 19. These windings are connected in series, respectively, with the potentiometer windings 23, 24, and 25, and since the potentiometers are grounded, the voltages developed across the potentiometer windings are effectively applied to the grids of the tubes 30, 31, and 32. Explaining this more in detail, it will be seen that the potentiometer winding 23, for example, is connected in series with the winding 17 of the generator and that an alternating voltage or difference in potential will be produced across the potentiometer due to the current flow in the series circuit. The greater part of the potentiometer winding is also included in the cathode grid circuit of tube 30, and hence the voltage produced at the potentiometer will be effective to determine the voltage of the grid with respect to that of the cathode. The grids of tubes 31 and 32 are controlled in the same way.

The speed of the motor 10, as determined by the number of poles, is so related to the number of teeth on the disks of the three-phase generator that when the motor is running on 60-cycle current the frequency of the generator output is also 60 cycles per second. However, it may be pointed out that a frequency relation other than unity may be used if desired.

The potentiometers 23, 24, and 25 are arranged so that when the disk generator is operating at its lowest output frequency, assumed to be 60 cycles per second, approximately the full voltages developed at the potentiometers are applied to the grids of the tubes 30, 31, and 32, and the windings 17, 18, and 19 are designed accordingly. The potentiometers should be so adjusted that equal voltages are supplied to the grids of the tubes. To this end the sliders 26, 27, and 28 may be mounted on independently adjustable sleeves 93, 94, and 95, respectively, which are held on the bar 92 by friction or in any suitable manner.

The output of the disk generator is amplified by the three-phase amplifier comprising tubes 30, 31, and 32 in known manner. Each tube operates to amplify one phase and to deliver controlling voltages to the associated tubes in the power amplifier. Thus the tube 30 is controlled from potentiometer 23 and by means of the transformer 33 supplies control voltages to the push-pull connected power amplifier comprising tubes 40 and 41. In a similar manner the tube 31 controls the power amplifier comprising tubes 42 and 43, while the tube 32 controls the power amplifier comprising tubes 44 and 45.

The power amplifiers are class B amplifiers, and hence the grids of the tubes draw grid current, which means that the tubes at the preceding stage must supply a certain amount of power in order to properly control the grids at the power tubes. This is the reason for using the Type 845 tubes, which have a power output of about thirty watts, or amply sufficient for the purpose.

The outputs of the three power amplifiers are coupled to the three-phase output circuit comprising conductors 60, 61, and 62 by means of the transformers 50, 51, and 52, and accordingly three-phase power at 60 cycles per second is supplied to the motor 63. The motor may be used for any desired purpose requiring a variable speed. It may be used, for example, in connection with certain types of timing apparatus which not only require a variable speed motor, but require a motor which can be run accurately at any desired speed within the range of speed variation which is provided for.

In order to secure efficient operation of the power amplifiers, the impedances of the output circuits of the amplifiers are properly matched against the impedances of the motor windings, which is the reason for providing the arrangements for adjusting the number of effective turns in the secondary windings of the transformers. The windings are so designed that when the generator is operating at a frequency of 60 cycles per second the proper matched relation is obtained if a considerable number of the turns of the secondary windings are cut out, and the sliders 56, 57, and 58 are set or pre-adjusted accordingly, as shown in the drawing. Means for independently adjusting the sliders may be provided if desired, but are usually not necessary as the adjustment is not critical.

It may be assumed now that it is desired to increase the speed of the motor 63 to the maximum, which is accomplished by raising the output frequency of the generator to the maximum value. The generator frequency is raised by adjusting the tuning knob 70, which is rotated in a clockwise direction until the pointer is at the other end of the scale. This operation raises the oscillator frequency to the upper limit of its range and similarly raises the frequency of the alternating current supplied to the motor 10. The motor 10 accordingly runs faster and drives the disk generator at a higher speed, and thus the rise in frequency manifests itself throughout the circuit with the result that the speed of the motor 63 is increased to the desired extent.

When the knob 70 is rotated as described in the foregoing, the shafts 73 and 76 are rotated also, and the automatic regulating devices hereinbefore described are automatically adjusted in accordance with the change in frequency in order to maintain proper operation of the generator.

At the motor 10 it is necessary to maintain the proper phase relation of the currents in the two windings of the motor, notwithstanding the change in frequency. Since the frequency is being raised from the lower limit, it is necessary to progressively decrease the value of the capacity which is in series with the leading phase winding of the motor, and accordingly the switching device, including the contactor 80, is arranged to be operated by the rack 78 and pinion 77 so as to cut out the condensers 84 to 88, inclusive, successively, until finally when the frequency has been raised to the maximum all of these condensers will be cut out and only the condenser 82 will be left in the circuit of the motor. Condenser 82 has such a value that at the maximum frequency the proper phase relation is obtained. The condensers 84 to 88, inclusive, have such values that the proper phase relation is obtained at intermediate frequency values, when one or more of the condensers 84 to 88, inclusive, will be connected in parallel with the condenser 82. It will be noted that the capacity adjustment takes place in steps, but this gives a sufficiently close regulation provided a reasonable number of adjustment steps are provided. The number of steps employed is in proportion to the range of frequency change to be covered.

At the three-phase disk generator the increase in driven speed is accompanied by a corresponding rise in the output voltage. Since it is desired to operate the tubes 30, 31, and 32 with a substantially constant range of grid potentials to avoid changing the output voltage delivered to the motor 63, and for other reasons, the potentiometers are automatically adjusted to progressively apply decreasing amounts of the developed voltages to the grids of the tubes. This is accomplished by means of the rack 91 and the pinion 90, which gradually move the bar 92 and the potentiometer sliders 26, 27, and 28 downward as the frequency is raised. Thus the grid voltages are taken from points on the potentiometers which are successively closer to the grounded terminals thereof and are of substantially constant amplitude notwithstanding the rise in the output voltage at the disk generator.

At the transformers 50, 51, and 52 the rise in frequency requires that more of the coils of the secondary windings be included in the output circuit in order to maintain the desired match with the impedance of the windings of the motor 63, since the impedance of the motor windings increases with the frequency. Accordingly the rack 97 and pinion 96 are arranged so as to pull the bar 98 downward as the frequency is increased, thereby gradually cutting in more of the coils of the layers 53, 54, and 55 of the secondary windings. By the time the upper limit of the frequency range is reached each secondary winding will have substantially all of its coils or turns effectively included in the output circuit.

In case the frequency is decreased in order to lower the speed of the motor 63, which is done by rotating the tuning knob 70 in a counter-clockwise direction, the reverse operations to those described take place; that is, the condensers 84 to 88, inclusive, are successively connected into the circuit of motor 10 in parallel with condenser 82, the sliders 26, 27, and 28 are moved upward to include more of the windings of the potentiometers in the associated grid circuits, and the sliders 56, 57, and 58 are moved upward to cut out coils or turns of the layers 53, 54, and 55 of the secondary windings of the transformers 50, 51, and 52. All this will be clear without further discussion. It will be clear also that the frequency can be adjusted to any desired value between the upper and lower limits of the frequency range and that corresponding adjustments of the contactor 80 and the two sets of sliders will be effected automatically.

It will be seen from the foregoing that the invention provides a variable frequency polyphase generator useful for operating a variable speed motor and for other purposes, which includes means for changing the frequency at will, and which includes adjusting devices at the various points in the circuit where the operating conditions are affected by frequency changes which function to make the circuit adjustments which are required in order to maintain proper and efficient operation of the generator.

The invention having been described, that which is believed to be new and for which the protection of Letters Patent is desired will be pointed out in the appended claims.

What is claimed is:

1. In a variable frequency power source, a source of single phase alternating current of variable frequency, a capacitor type quarter-phase synchronous motor operating on said current, a three-phase generator driven by said motor, a three-phase power amplifier controlled by the generator output, transformers coupling said amplifier to a three-phase motor, and means for simultaneously adjusting the frequency of said alternating current, the capacity in one phase of the circuit of the quarter-phase motor, the effective output voltage of the generator, and the primary to secondary coupling ratio at the transformers.

2. In combination, a source of single phase alternating current, a capacitor type two-phase motor adapted to be driven from said source, a polyphase generator driven by said motor, a polyphase pre-amplifier controlled by the generator output, a plurality of power amplifiers controlled by said pre-amplifier, an output circuit, transformers coupling said power amplifiers to said output circuit, means for changing the frequency of said source, and means for automatically adjusting the capacity in the circuit of said motor, the voltage applied to said pre-amplifier by said generator, and the primary to secondary turn ratio in said transformers in accordance with the change in frequency.

3. In combination, a source of variable frequency single phase alternating current, a capacitor type motor driven by said current, a generator driven by said motor, an amplifier for amplifying the output of said generator, means for changing the frequency of said source, and means for automatically adjusting the capacity associated with said motor and the voltage delivered to said amplifier by said generator to compensate for the change in frequency.

4. In combination, a circuit carrying single phase alternating current of variable frequency, a two-phase circuit derived from said single phase circuit by means of a capacity, a two-phase motor to which power is delivered over said two-phase circuit, means for adjusting the frequency of said single phase current, and means for simultaneously and automatically adjusting the value of said capacity to maintain the proper phase relation between the two phases of said two-phase circuit notwithstanding the change in frequency.

5. In combination, a source of single phase alternating current, a two-phase motor, means including a capacity for deriving two-phase alternating current from said single phase alternating current, a device for varying the frequency of said single phase alternating current to vary the speed of said motor, a device for varying the value of said capacity to maintain the proper phase relation between the phases of the two-phase alternating current, and a coupling between said devices, whereby the adjustment of one device automatically causes the adjustment of the other.

6. In combination, a polyphase generator, a polyphase amplifier, a polyphase motor, potentiometers for coupling said generator to said amplifier, transformers for coupling said amplifier to said motor, said transformers having adjustable secondary windings, means for changing the speed of said generator, thereby causing a change in its voltage and frequency, and means for automatically and simultaneously adjusting said potentiometers to compensate for the change in voltage and said transformers to compensate for the change in the impedance of the motor responsive to the change in frequency.

7. A three-phase power supply source comprising means for producing three-phase control voltages, a three-phase pre-amplifier controlled by said voltages, three push-pull power amplifiers controlled by said pre-amplifier, each power amplifier comprising two high vacuum grid controlled space discharge devices, a three-conductor three-phase output circuit, and transformers coupling said power amplifiers to said output circuit.

8. A polyphase power supply source comprising means for generating single phase alternating current, means operated by said current for generating polyphase alternating current, a polyphase pre-amplifier controlled by said polyphase current, a plurality of power amplifiers controlled by said pre-amplifier, one for each phase, each amplifier including a high vacuum grid controlled space discharge device, an output circuit, and transformers coupling said power amplifiers to said output circuit.

9. In combination, a motor, a generator including a rotatable element driven by said motor, an amplifier for amplifying the output of said generator, means including a transformer for delivering power from said amplifier to a second motor, the impedance of the secondary winding of said transformer bearing a predetermined relation to the impedance of said second motor at a given frequency, means for changing the speed of said first motor to change the frequency, and means coupled to said speed changing means for automatically changing the number of effective turns in said secondary winding to maintain said impedance relation substantially constant.

10. In combination, a motor, a generator for supplying alternating current, means including a transformer for delivering power from said generator to said motor, the impedance of the secondary winding of said transformer bearing a desirable relation to the impedance of said motor at a given generator frequency, means for changing the generator frequency, and means responsive to the operation of said frequency changing means for automatically changing the number of effective turns in said secondary winding to maintain said impedance relation substantially constant.

11. In combination, a generator, a load for said generator requiring a variable frequency and a constant voltage, a device for varying the speed of said generator to vary the frequency, a device for adjusting the ratio of the generator voltage to the voltage applied to said load in order to compensate for the change in generator voltage which is caused by the change in generator speed, and a coupling between said devices whereby the adjustment of one device automatically effects a corresponding adjustment of the other device.

12. In combination, a polyphase generator, a polyphase amplifier for amplifying the output of said generator, means including output transformers for delivering power from said amplifier to a polyphase motor, means for changing the speed of said generator to change the output frequency and thereby change the speed of said motor, and means coupled to said speed changing means for automatically adjusting the number of effective turns in the secondary windings of said transformers to compensate for the change in the impedance of the motor due to the change in the output frequency.

THOMAS B. GIBBS.